United States Patent
Cojocariu et al.

(10) Patent No.: US 7,297,381 B2
(45) Date of Patent: *Nov. 20, 2007

(54) LIGHT DIFFUSING FILMS, METHODS OF MAKING THE SAME, AND ARTICLES USING THE SAME

(75) Inventors: Cristina Cojocariu, Evansville, IN (US); Emine Elif Gurel, Evansville, IN (US); Grant Hay, Evansville, IN (US); Philip M. Peters, Mt. Vernon, IN (US); Shixiong Zhu, Evansville, IN (US); Christopher A. Coenjarts, Evansville, IN (US); Gareth Charles Riggs, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,097

(22) Filed: May 8, 2006

(65) Prior Publication Data

US 2006/0263547 A1    Nov. 23, 2006

Related U.S. Application Data

(63) Continuation-in-part of application No. 11/381,023, filed on May 1, 2006, and a continuation-in-part of application No. 11/133,983, filed on May 20, 2005.

(51) Int. Cl.
*G02B 1/04* (2006.01)
*G02B 5/02* (2006.01)

(52) U.S. Cl. .......... 428/1.3; 428/1.1; 428/323; 428/327; 428/332; 349/64; 349/112; 359/452; 359/453; 359/599

(58) Field of Classification Search ............ 428/1.1, 428/1.3, 323, 327, 332; 349/64, 112; 359/452–456, 359/599
See application file for complete search history.

(56) References Cited

U.S. PATENT DOCUMENTS 3,594,264 A    7/1971    Urban (Continued)

FOREIGN PATENT DOCUMENTS

EP    0269324 A2    6/1988

(Continued)

OTHER PUBLICATIONS

International Search Report; International Application No. PCT/US2006/019153; International Filing Date: May 17, 2006; Date of Mailing: Jan. 15, 2007; 8 pages.

(Continued)

*Primary Examiner*—Rena Dye
*Assistant Examiner*—Sow-Fun Hon
(74) *Attorney, Agent, or Firm*—Cantor Colburn LLP

(57) ABSTRACT

Disclosed herein are light diffusing films, methods of making the same and articles using the same. In one embodiment, a light diffusing film is formed from a composition comprising: a polycarbonate, phosphite stabilizer, epoxy stabilizer, hindered phenol stabilizer, and light diffusing particles having a refractive index of about 1.3 to about 1.7. The film comprises a hiding power of 0 to about 0.5. In one embodiment, a method for producing a film comprises combining a polycarbonate, a phosphite stabilizer, an epoxy stabilizer, and light diffusing particles to form a combination, and forming the combination into the film.

22 Claims, 4 Drawing Sheets

U.S. PATENT DOCUMENTS

| | | | |
|---|---|---|---|
| 3,635,895 A | | 1/1972 | Kramer |
| 3,945,979 A | | 3/1976 | Kobayashi et al. |
| 4,001,184 A | | 1/1977 | Scott |
| 4,066,611 A | | 1/1978 | Axelrod |
| 4,118,370 A | * | 10/1978 | Sannes et al. .............. 524/101 |
| 4,217,438 A | | 8/1980 | Brunelle et al. |
| 5,237,004 A | | 8/1993 | Wu et al. |
| 5,352,747 A | * | 10/1994 | Ohtsuka et al. ............. 525/464 |
| 5,717,057 A | | 2/1998 | Sakashita et al. |
| 6,376,078 B1 | | 4/2002 | Inokuchi |
| 6,417,831 B2 | * | 7/2002 | Kashima .................... 345/102 |
| 6,518,340 B1 | * | 2/2003 | Fishburn et al. ............ 524/195 |
| 6,556,347 B1 | * | 4/2003 | Murayama et al. ......... 359/453 |
| 6,624,933 B2 | * | 9/2003 | Fujita ......................... 359/456 |
| 6,664,313 B2 | * | 12/2003 | Hirai et al. ................. 523/209 |
| 6,773,787 B2 | | 8/2004 | Maas et al. |
| 6,908,202 B2 | | 6/2005 | Graf et al. |
| 7,098,263 B2 | * | 8/2006 | Mitsunaga et al. ......... 524/445 |
| 2003/0108710 A1 | | 6/2003 | Coyle et al. |
| 2004/0114228 A1 | | 6/2004 | Jinno et al. |
| 2004/0228141 A1 | | 11/2004 | Hay et al. |
| 2005/0215750 A1 | | 9/2005 | Koga et al. |
| 2005/0277713 A1 | | 12/2005 | Pearson et al. |

FOREIGN PATENT DOCUMENTS

| | | |
|---|---|---|
| EP | 0634445 A1 | 1/1995 |
| EP | 1635196 A1 | 3/2006 |
| JP | 2003-001915 | 8/2003 |
| WO | 2006/026743 A1 | 3/2006 |

OTHER PUBLICATIONS

Excerpt from JIS (Japanese Industrial Standards) JIS B 0031 (1994), Surface Roughness; 1 page.

ASTM D 4674-02a:Standard Practice for Accelerated Testing For Color Stability of Plastics Exposed to Indoor Office Environments, (2003).

ASTM E 313-00: Standard Practice for Calculating Yellowness and Whiteness Indices from Instrumentally Measured Color Coordinates, (2001).

ASTM D1003-00: Standard Test Method for Haze And Luminous Transmittance of Transparent Plastics, (2000).

* cited by examiner

LIGHT DIFFUSING FILMS, METHODS OF MAKING THE SAME, AND ARTICLES USING THE SAME

CROSS-REFERENCE TO RELATED APPLICATIONS

This application is a continuation-in-part application of U.S. patent application Ser. No. 11/381,023, filed May 1, 2006, and is a continuation-in-part application of U.S. patent application Ser. No. 11/133,983, filed May 20, 2005, both of which are hereby incorporated by reference in their entirety.

BACKGROUND

In many backlight display devices, for example in liquid crystal display televisions (LCD TV), there is a demand for larger and larger displays. As the size of a display increases, the number of light sources (e.g., a cold cathode fluorescent lamp (CCFL)) used to backlight the display can also increase. Accordingly, the backlight display system can desirably comprise a light diffusing film (also referred to as a light diffusing sheet, a plate, and the like). Examples of the utility of the light diffusing film includes, but is not limited to, hiding the light and dark pattern that can be created by an array of CCFLs, hiding injection molded patterns or printing on a light guide of the display device, providing uniformity in illumination, and the like.

Accordingly, a continual need exists in the art for improved light diffusing devices, especially those light diffusing films employed in LCD TVs.

SUMMARY

Disclosed herein are light diffusing films, methods of making the same, and articles using the same.

In one embodiment, a light diffusing film is formed from a composition comprising: a polycarbonate, phosphite stabilizer, epoxy stabilizer, hindered phenol stabilizer, and light diffusing particles having a refractive index of about 1.3 to about 1.7. The film comprises a hiding power of 0 to about 0.5.

In one embodiment, a method for producing a film comprises combining a polycarbonate, a phosphite stabilizer, an epoxy stabilizer, and light diffusing particles to form a combination, and forming the combination into the film.

In one embodiment, a display device comprises: a liquid crystal display, a light source disposed in optical communication with the liquid crystal display, and a light diffusing film disposed between the liquid crystal display and the light source. The light diffusing film comprises a polycarbonate, a phosphite stabilizer, an epoxy stabilizer, and light diffusing particles having a refractive index of about 1.3 to about 1.7. The light diffusing film comprises a hiding power of 0 to about 0.5.

The above-described and other features will be appreciated and understood from the following detailed description, drawings, and appended claims.

BRIEF DESCRIPTION OF THE DRAWINGS

Refer now to the figures, which are exemplary embodiments, and wherein the like elements are numbered alike.

DETAILED DESCRIPTION

Figure 1:
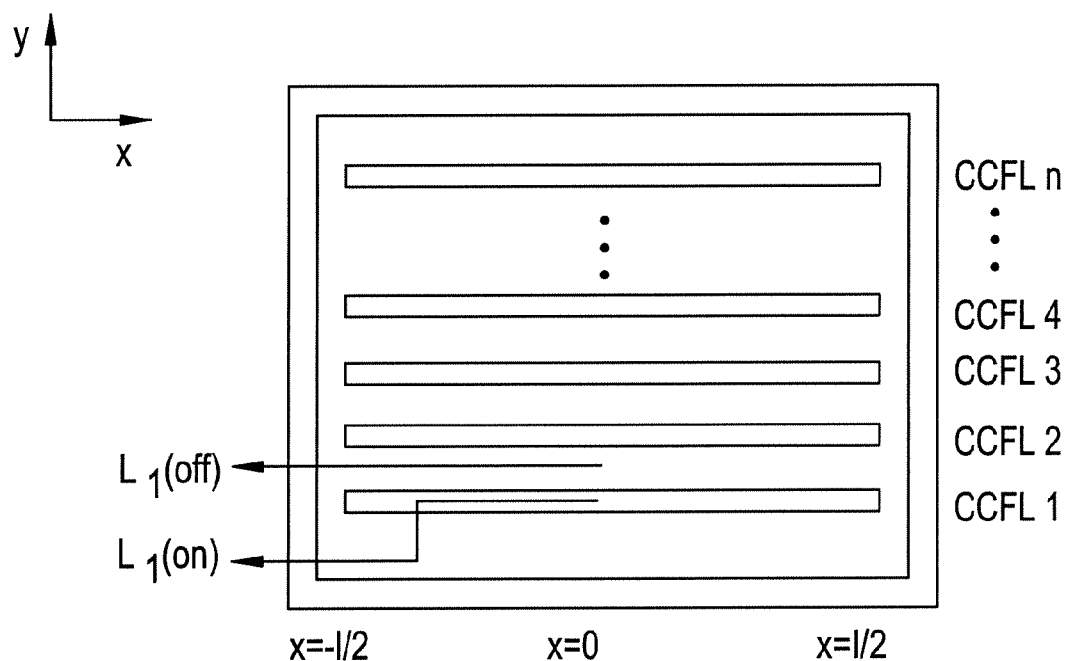
FIG. 1 is a cross sectional view of a linear array of cold cathode fluorescent lamps (CCFLs).

Disclosed herein are optical films, more particularly light diffusing films comprising a polymeric material and light diffusing particles. The polymeric material is a material that, when made into a $\frac{1}{8}^{th}$ thick bar, the bar has a light transmission of greater than or equal to about 80%. Unless specifically set forth herein otherwise, all transmission is measured in accordance with ASTM D1003-00, procedure B measured with instrument Macbeth 7000A, D65 illuminant, 10° observer, CIE (Commission Internationale de L'Eclairage) (1931), and SCI (specular component included), and UVEXC (i.e., the UV component is excluded). Exemplary polymeric materials include polycarbonate, poly(methyl) acrylate, poly(ethylene terephthalate) (PET), as well as combinations comprising at least one of the foregoing, such as methyl methacrylate-styrene (MS) copolymer.

The light diffusing particles can have a refractive index (RI) of about 1.3 to about 1.7 (e.g., silsesquioxanes, acrylics, and so forth, as well as combinations comprising at least one of the foregoing), and/or can have a RI that is based upon the matrix RI. For example the light diffusing particles can have a RI that is greater than or equal to the matrix RI. In another embodiment, the light diffusing particles can have a RI that is ±8% of the matrix RI. The light diffusing film can comprise a light transmission of about 45% to about 80%.

As will be explained in greater detail below, it has been discovered that light diffusing films comprising the formulations disclosed herein can have increased luminance and/or improved "hiding power" compared to other light diffusing films (e.g., compared to PC1311-50, a polycarbonate light diffusing sheet available from Teijin Chemical Ltd. of Japan), thereby providing a significant commercial advantage. Furthermore, these light diffusing films can be a single, solid, unitary film characterized by the absence of multiple layers.

The present diffusing film can attain low color shift. For example, the color shift of the light diffusing film after 1,000 hour (hr) ultraviolet (UV) accelerated weathering according to ASTM D4674, method 3, is dx of less than or equal to (<) 0.0005, and dy less than or equal to (<) 0.0006. "dx" is the shift in x chromaticity coordinate and "dy" is the shift from y chromaticity coordinate as measured with instrument Macbeth 7000A, D65 illuminant, 10° observer, CIE (1931), SCI, and UVEXC.

While the light diffusing films are particularly suited for use in liquid crystal display televisions (LCD TVs), it is to be understood that any reference to LCD TVs throughout this disclosure is made merely for ease in discussion and it is to be understood that other devices and applications are envisioned to be within the scope of this disclosure. For example, the light diffusing film can be employed in any display device (e.g., a backlight display device), such as LCD TVs, laptop computers, instrument displays, and so forth.

The term "hiding power" as used herein refers to the ability of light diffusing films to mask the light and dark pattern produced by, for example, a linear array of fluorescent lamps (e.g., cold cathode fluorescent lamps). Quantitatively, hiding power can be mathematically described by FIG. 1 and the following equation:

$$\text{Hiding power}(\%) = \left|1 - \frac{\sum_{i=1}^{n-1} L_i(\text{on})}{\sum_{j=1}^{n-1} L_j(\text{off})}\right| \times 100$$

where: $L_i(\text{on})$=Luminance above with CCFL
$L_j(\text{off})$=Luminance at the midpoint between lamp j and lamp j+1
n: number of CCFL lamps The point between adjacent CCFLs is relatively darker in comparison to the point above a CCFL. By way of example, the terms L (on) and L (off) and CCFL are shown in FIG. 1 in relation to a cross sectional view of an array of CCFLs. Luminance values that are used to calculate hiding power ($L_i(\text{on})$ and $L_j(\text{off})$) are measured along the points on vertical y axis, where x coordinate is equal to 0, where "1" is the length of CCFL lamp as shown in FIG. 1. The average luminance is defined in relation to a 13 points test determined per Video Electronic Standard Association (VESA) flat panel display measurements (FPDM) version 2.

For example, the light diffusing film can comprise a hiding power of 0 to 0.5, more particularly a hiding power of 0 to about 0.3 when calculated by the above described mathematical formula for hiding power and using the 13 points for average luminance measured using a BM-7 Topcon instrument (commercially available from Topcon Corporation, Japan).

Figure 2:
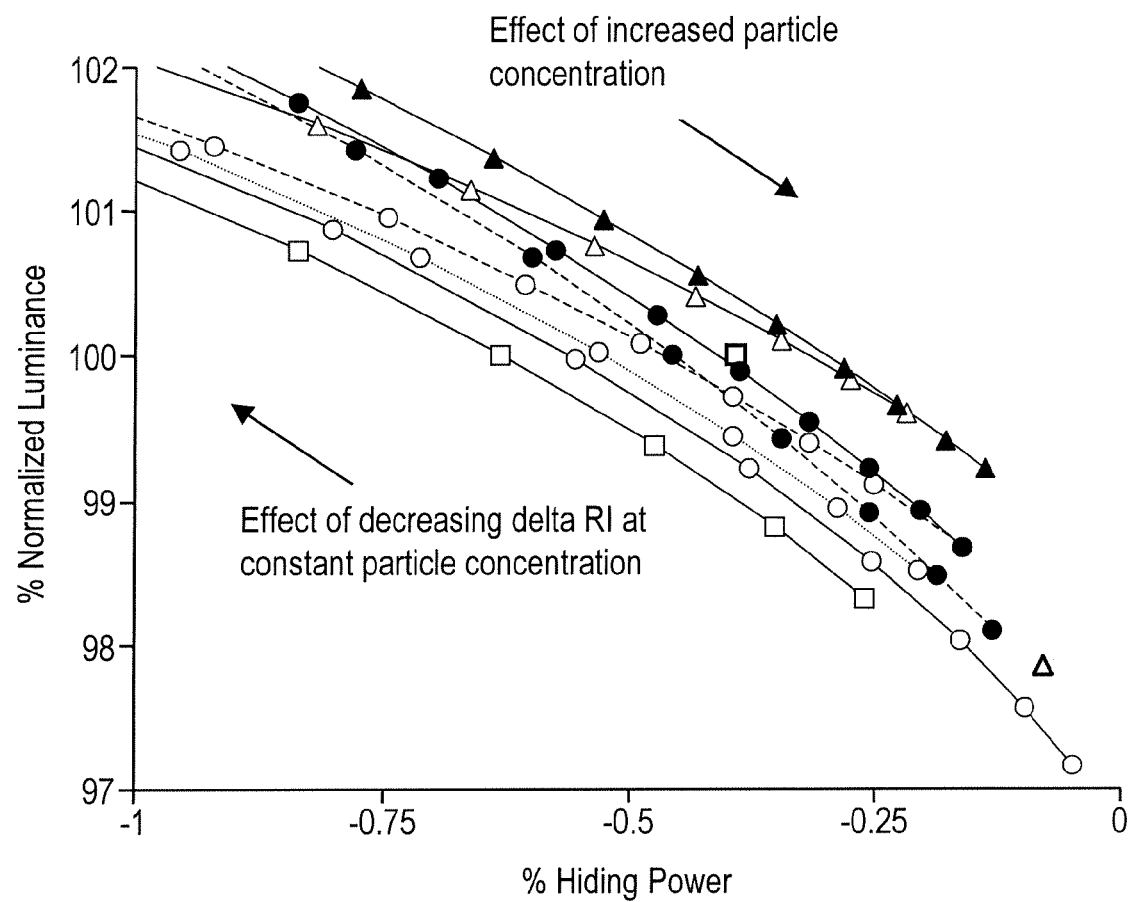
FIG. 2 maps luminance versus hiding power design space using an optical model.

FIG. 2 illustrates luminance versus hiding power design space mapped using optical model. PC 1311-60 and PC 1311-50 sheets (commercially available from Teijin Chemical Ltd. of Japan) have 60% and 50% transmission, respectively. The particle concentration in the polycarbonate (PC) is provide in parentheses in parts per hundred by weight (pph), based upon a combined total of PC and light particles of 100 parts. W/laser refers to light collimating texture on the sheet, while delta RI is the difference between particle refractive index and PC refractive index (i.e., 1.586). As can be seen from the graph, the crosslinked PMMA-PS with a particle size of 4 micrometers (μm), at a concentration of 0.375 to 6.0 pph, had the highest luminance while still attaining the desired hiding power (e.g., 0% to -0.5%).

Figure 3:
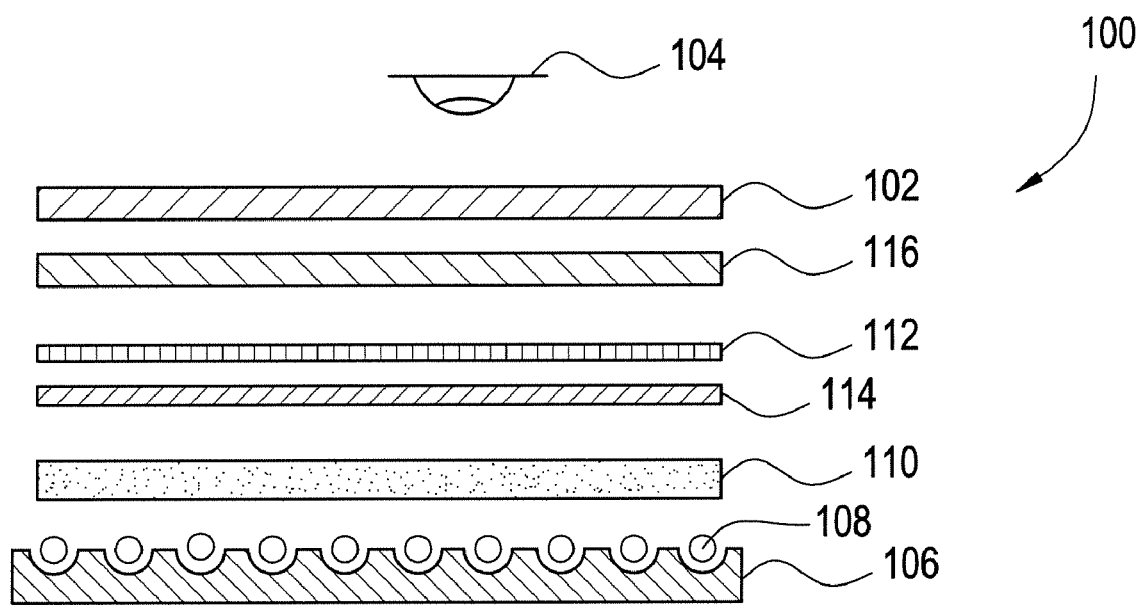
FIG. 3 is a cross sectional, exploded view of a display device.

Referring now to FIG. 3, a cross sectional, exploded view of an exemplary backlight display device generally designated 100 is illustrated. The backlight display device 100 includes multiple components arranged (e.g., stacked) in various combinations depending on the desired application. Generally, the backlight display device 100 can comprise two outer components with varying components disposed between the two outer components. For example, the backlight display device 100 can comprise a liquid crystal display (LCD) 102 defining an outer side closest to a viewer 104 of the backlight display device 100 and a reflective film 106 defining the second outer side. A light source 108 for generating light can be disposed between the LCD 102 and the reflective film 106, wherein the light source 108 can be in physical communication and/or optical communication with the reflective film 106. A light diffusing film 110 can be disposed between the LCD 102 and the reflective film 106 such that the light diffusing film 110 can be in physical communication and/or optical communication with the light source 108. The backlight display device 100 can further include optional films 112, 114 disposed between the light source 108 and the LCD 102. Suitable optional films include, but are not limited to, prismatic films (PFs), light diffusing films, as well as combinations comprising at least one of the foregoing. Additionally, an optional prismatic film 116 can be disposed between the LCD 102 and the light diffusing film 110.

The number and arrangement of additional components (e.g., optional films 112, 114) can vary depending on the desired application. For example, films are envisioned that can act as both a light diffusing film and as a prismatic film, which can reduce the total number of films employed in the backlight display device 100.

The number of light source(s) 108 can vary depending on the desired application and the size of the backlight display device 100. The light source 108 can include any light source suitable to backlight the LCD 102. Suitable light sources include, but are not limited to, fluorescent lamps (e.g., cold cathode fluorescent lamps (CCFLs)) and light-emitting diodes.

The reflective film 106 includes a reflective material that is adapted to reflect light and can take many forms (e.g., a planar shape, such as a plate, a sheet, and the like). For example, suitable reflective materials include, but are not limited to, metals (e.g., aluminum, silver, and so forth), metal oxides (e.g., titanium oxide, and so forth), thermoplastic materials (e.g., Spectralon® commercially available from Labsphere, Inc.), and so forth, as well as combinations comprising at least one of the foregoing, such as titanium oxide pigmented Lexan®) (commercially available from General Electric Co.), and the like.

The prismatic film 116 can use light-directing structures (e.g., prismatic structures) to direct light along the viewing axis (i.e., normal to the display), which enhances the brightness of the light viewed by the user (e.g., viewer 104) of the display and which allows the system to use less power to create a desired level of on-axis illumination. For example, the prismatic film can include macroscale, microscale, and/or nanoscale surface features (e.g., retroreflective elements, and so forth). Macroscale surface features have a size of approximately 1 millimeter (mm) to about 1 meter (m) or the entire size of the part being formed; i.e. of a size scale easily discerned by the human eye. Microscale surface features have a size of less than or equal to about 1 mm, or, more specifically, greater than 100 nanometers (nm) to about 1 mm. Nanoscale surface features have a size of less than or equal to about 500 nm, or, more specifically, less than or equal to about 100 nm, or, even more specifically, less than or equal to about 20 nm, and yet more specifically, about 0.5 nm to 10 nm. Some possible surface features include various geometries such as cube-corners (e.g., triangular pyramid), trihedral, hemispheres, prisms, ellipses, tetragonal, grooves, channels, and others, as well as combinations comprising at least one of the foregoing. Some possible structures and materials are discussed in U.S. Patent Application No. 2003/0108710 to Coyle et al.

The terms "polycarbonate" and "polycarbonate resin" means compositions having repeating structural carbonate units of the formula (1):

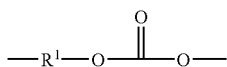

in which at least 60 percent of the total number of $R^1$ groups are aromatic organic radicals and the balance thereof are aliphatic, alicyclic, or aromatic radicals. In one embodiment, each $R^1$ is an aromatic organic radical and, preferably, a radical of the formula (2):

$$-A^1-Y^1-A^2- \quad (2)$$

where each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

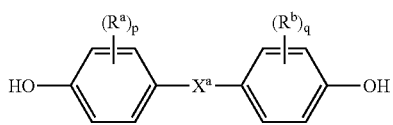

wherein $R^a$ and $R^b$ each represent a halogen atom or a monovalent hydrocarbon group and may be the same or different; p and q are each independently integers of 0 to 4; and $X^a$ represents one of the groups of formula (5):

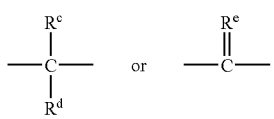

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and so forth, as well as mixtures comprising at least one of the foregoing dihydroxy compounds.

A nonexclusive list of specific examples of the types of bisphenol compounds that are represented by formula (3) includes 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and combinations comprising at least one the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents are added at a level of about 0.05 wt % to about 2.0 wt %. Branching agents and procedures for making branched polycarbonates are described in U.S. Pat. Nos.

3,635,895 and 4,001,184. All types of polycarbonate end groups are contemplated as being useful in the polycarbonate composition.

"Polycarbonates" and "polycarbonate resins" as used herein further includes copolymers or blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

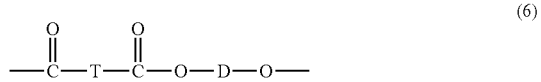

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and is, for example, a $C_{2-10}$ alkylene radical, a $C_{6-20}$ alicyclic radical, a $C_{6-20}$ alkyl aromatic radical, or a $C_{6-20}$ aromatic radical.

Without being bound by theory, the yellowness index (YI) of the polycarbonate resin can be a factor that contributes to obtaining the desired luminance and hiding power of the light diffusing film 110. The polycarbonate can have a yellowness index sufficient to provide the desired properties to the light diffusing film 110. For example, polycarbonate resin can have a yellowness index of about 0.8 to about 1.5, particularly about 0.9 to about 1.3. Unless specifically specified otherwise, yellowness index herein is measured in accordance with ASTM E313-73 (D1925).

In an embodiment, the polycarbonate can be present in an amount sufficient to act as a matrix for the light diffusing particles of the light diffusing film 110. For example, the polycarbonate can be present in an amount of about 90 weight percent (wt %) to about 99.999 wt %, based on a total weight of the light diffusing film 110. Particularly, the light diffusing film 110 can comprise about 94 wt % to about 99.999 wt % polycarbonate, even more particularly about 95 wt % to about 98 wt % polycarbonate, based on the total weight of the light diffusing film. In another embodiment, the polycarbonate can be present in an amount of about 98 wt % to about 99.800 wt %, based on the total weight of the light diffusing film.

Suitable light diffusing particles of the light diffusing film 110 can comprise a material having a refractive index of about 1.3 to about 1.7, or, more specifically, about 1.4 to about 1.6, or, even more specifically, about 1.5 to about 1.57, or, even more specifically, 1.51 to about 1.53. In another embodiment, the light diffusing particles can have a refractive index of about 1.3 to about 1.7, or, more specifically, about 1.45 to about 1.59, or, yet more specifically, about 1.49 to about 1.55, and yet more specifically about 1.50 to about 1.53. Unless specifically specified otherwise, the refractive indices set forth herein are measured at the Sodium D line with a wavelength of 589 nanometers (nm).

In another embodiment, the light diffusing particles can have a refractive index that is greater than the refractive index of the matrix. For example, the light diffusing particle refractive index can be greater than the refractive index of the matrix. In another embodiment, the light diffusing particle refractive index can be about ±8% of the matrix refractive index, or, more specifically, about ±5% of the matrix refractive index, or, even more specifically about ±3% of the matrix refractive index. For example, if the matrix refractive index is 1.65, and the light diffusing particle refractive index is about ±5% of the matrix refractive index, the light diffusing particle refractive index is about 1.57 to about 1.73.

Possible light diffusing particles include materials that have the desired optical properties, including the desired refractive index. Desirably, these particles have sufficient compatibility with the matrix material and can be produced with the desired surface characteristics. Some possible particles include silsesquioxanes, both organic and inorganic (e.g., polyhydride silsesquioxanes, and so forth). Examples of polyorgano silsesquioxanes are polyalkyl silsesquioxanes where the alkyl groups have 1 to 18 carbon atoms, and may be saturated or unsaturated. Exemplary alkyl groups include methyl, ethyl, and branched, unbranched, and cyclic saturated $C_3$ to $C_{18}$ hydrocarbons (including cycloaliphatic hydrocarbons such as cyclopentyl and cyclohexyl), phenyl, vinyl, and so forth. Examples of silsesquioxanes include polymethyl silsesquioxanes, polyphenyl silsesquioxanes, polyphenyl-methyl silsesquioxanes, phenyl silsesquioxane-dimethyl siloxane copolymers in liquid form, polyphenyl-vinyl silsesquioxanes, polycyclohexyl silsesquioxanes, polycyclopentyl silsesquioxanes, and so forth. In a particular embodiment, all of the light diffusing particles are polymethyl silsesquioxane.

Other possible types of light-diffusing particles are organic polymers such as, for example, fluorinated polymers (e.g., poly(tetrafluoroethylene)), and homopolymers, and copolymers formed from styrene and derivatives thereof, as well as acrylic acid and derivatives thereof, for example $C_{1-8}$ alkyl acrylate esters, $C_{1-8}$ alkyl methacrylate esters, and so forth. The copolymers can be derived from the copolymerization of acrylic acid with a derivative thereof; from the copolymerization of two or more different derivatives of acrylic acid (e.g., methyl methacrylate, butyl acrylate, and so forth); or from the copolymerization of acrylic acid and/or a derivative thereof with an ethylenically unsaturated compound such as styrene, a styrene derivative, acrylonitrile, or the like. Specific exemplary organic polymers include, but are not limited to, poly(styrene), poly(acrylic acid), poly (methyl methacrylate), poly(acrylic acid-styrene) copolymers, and poly($C_{1-8}$ alkylacrylate-$C_{1-8}$ alkylmethacrylate) copolymers, including core-shell polymers. In one embodiment, the polymers are crosslinked, for example crosslinked polyacrylic acid or crosslinked poly($C_{1-8}$ alkylacrylate-$C_{1-8}$ alkylmethacrylate) copolymers. Combinations comprising one or more of the foregoing organic polymers can be used. Selection of the appropriate organic polymer, in particular those derived from styrene and derivatives thereof, as well as acrylic acid and derivatives thereof, allow adjustment of the refractive index from less than or equal to 1.589 (polystyrene only) to greater than or equal to about 1.49 (poly (methyl methacrylate) only).

Still another possible type of light-diffusing particle is inorganic, for example metal sulfates (such as barium sulfate, calcium sulfate, and so forth), metal oxides and hydroxides (such aluminum oxide, zinc oxide, silicon dioxide, and so forth), metal carbonates (such as calcium carbonate, magnesium carbonate, and so forth), metal silicates such as sodium silicate, aluminum silicate, and mica, clay, and so forth, as well as combinations comprising at least one of the foregoing inorganic materials.

Combinations comprising at least one of any of the above particles can also be employed.

The average particle size of the light diffusing particles is based upon the desired diffusing effect and loading of the light diffusing particles, with average particle sizes of up to and even greater than 10 micrometers (μm) possible. In many embodiments, the light diffusing particles have an average particle size of less than or equal to about 8 μm, or, more specifically, less than or equal to about 5 μm. More particularly, in some embodiments, the light diffusing particle can have an average particle size of less than or equal to about 2 micrometers. In some embodiments, the light diffusing particle can have an average particle size of about 1 micrometer to about 3 micrometers, while in other embodiments, the average particle size can be about 2 μm to about 5 μm, or, more particularly, about 3 μm to about 5 μm. The particle size is an average particle diameter as measured along a major axis (i.e., the longest axis) of the particle. The particles can vary in shape and size. Suitable particle shapes include, but are not limited to, spherical, ellipsoidal (sometimes referred to as biconvex lens shaped), irregular, and so forth. Further, the particles can be solid or hollow.

Figure 5:
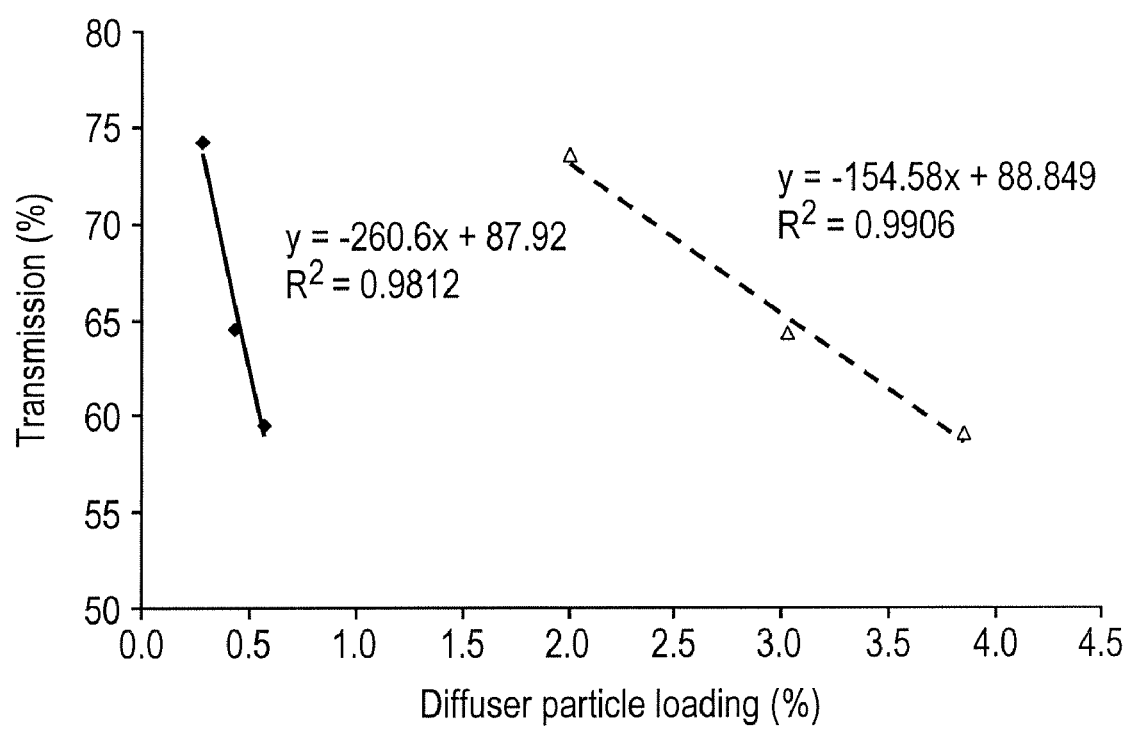
FIG. 5 is a graphical representation of transmission versus light diffusing particle loading for Tospearl* and crosslinked PMMA-PS.

The light diffusing particle can be present in a sufficient amount to impart the desired properties to the light diffusing film (e.g., the desired luminance, hiding power, and/or transmission). For example, the light diffusing particles can be present in an amount of up to about 20 wt % or so, based upon a total weight of the film. More particularly, the light diffusing particles can be present in an amount of about 0.001 wt % to about 10 wt %, or, even more particularly, about 0.001 wt % to about 7 wt %, or, yet more particularly, about 0.001 wt % to about 3 wt %, and even more particularly about 0.05 wt % to about 2 wt %. The light diffusing particles can even be present in an amount of about 1 wt % to about 7 wt %, or, more specifically, about 2 wt % to about 5 wt %, or, even more specifically, about 3 wt % to about 5 wt %. The weight percents are based on a total weight of the light diffusing film. FIG. 5 illustrates diffuser particle loading with respect to the transmission for the Tospearl* and the crosslinked PMMA-PS particles.

The composition used in the light diffusing film can further include various additives that do not substantially adversely affect the desired film properties. Possible additives include impact modifiers, fillers, stabilizers (e.g., heat stabilizers, light stabilizers, and so forth), antioxidants, mold release agents, lubricants, flame retardants, anti-drip agents, optical brighteners, and combinations comprising at least one of the foregoing. The additives can be present in an amount effective to impart the desired effect to the light diffusing film. For example, the additive can be present in an amount of about 0.001 wt % to about 10 wt %, or so, based on a total weight of the light diffusing film.

In some embodiments, the film can be formed by combining the polycarbonate and light diffusing particles with an epoxy stabilizer and a phosphite stabilizer, and, optionally, a hindered phenol stabilizer, and then forming the film therefrom. In a particular application, the film can be formed by combining the polycarbonate and light diffusing particles with an epoxy stabilizer, a phosphite stabilizer, and a hindered phenol stabilizer, and then forming the film therefrom.

The epoxy stabilizer is a molecule having an epoxy group, and may comprise an additional functional group such as hydroxyl, carboxylic acid, carboxylic acid ester, and the like. More than one epoxy group and more than one functional group may be present. Specific examples of the epoxy stabilizer include epoxidized soybean oil, epoxidized linseed oil, phenyl glycidyl ether, allyl glycidyl ether, tert-butylphenyl glycidyl ether, 3,4-epoxycyclohexylmethyl-3,4'-epoxycyclohexyl carboxylate, 3,4-epoxy-6-methylcylohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethyleneoxide, cyclohexylmethyl-3,4- epoxycyclohexyl carboxylate, 3,4-epoxy-6-methylcyclohexylmethyl-6'-methylcyclohexyl carboxylate, bisphenol A glycidyl ether, tetrabromobisphenol A glycidyl ether, diglycidyl phthalate, diglycidyl hexahydrophthalate, bis-epoxydicyclopentadienyl ether, bis-epoxyethylene glycol, bis- epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2- epoxycyclohexane, 3-methyl-5-tert- butyl-1,2-epoxycyclohexane, octadecyl-2,2- dimethyl-3,4-epoxycyclohexyl carboxylate, N-butyl-2,2-dimethyl-3, 4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-tert-butyl-4,5-epoxytetrahydrophthalic anhydride, diethyl-4,5-epoxy-cis-1,2-cyclohexyl dicarboxylate, and di-n-butyl-3-tert-butyl-4,5-epoxy-cis-1,2-cyclohexyl dicarboxylate. The epoxy compounds may be used singly or in combination. Of these, epoxy carboxylates, in particular alicyclic epoxy carboxylates such as 3,4-epoxycyclohexylmethyl-3',4'-epoxycyclohexyl carboxylate may be used.

The epoxy stabilizer can be combined with the polycarbonate and light diffusing particles in an amount of about 0.005 wt % to about 0.06 wt %, or, more specifically, about 0.01 wt % to about 0.04 wt %, or, even more specifically, about 0.015 wt % to about 0.03 wt %, based upon a total weight of the ingredients in the composition (e.g., that are combined to form the film).

The phosphite stabilizer is a phosphorus-containing compound having a structure of formula (a), (b), (c), (d), or (e)

(a)

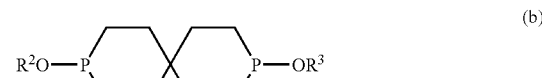

(b)

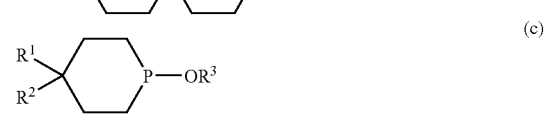

(c)

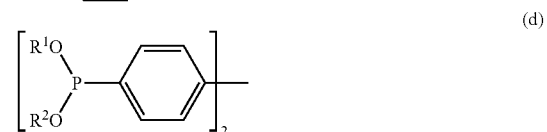

(d)

(e)

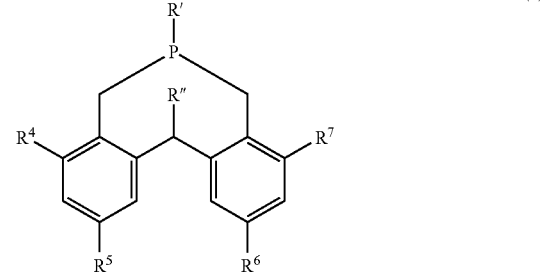

wherein $R^1$, $R^2$ and $R^3$ are each independently a hydrogen, $C_1$-$C_{22}$ alkyl, substituted $C_1$-$C_{22}$ alkyl, $C_3$-$C_8$ cycloalkyl, substituted $C_3$-$C_8$ cycloalkyl, heteroaryl, aryl, or substituted aryl; R' is a halogen or $OR^1$; R", $R^4$, $R^5$, $R^6$, and $R^7$ are each independently a hydrogen, $C_1$-$C_{22}$ alkyl, substituted $C_1$-$C_{22}$ alkyl, $C_3$-$C_8$ cycloalkyl, substituted $C_3$-$C_8$-cycloalkyl, heteroaryl, or aryl.

The term "substituted" as used herein means that a hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

Exemplary groups that may be present on a "substituted" position include, but are not limited to, halogen; cyano; hydroxyl; nitro; alkanoyl (such as a $C_{2-6}$ alkanoyl group such as acyl or the like); carboxamido; $C_{1-6}$ alkyl; $C_{3-6}$ cycloalkyl, $C_{2-8}$ alkenyl; $C_{2-6}$ alkynyl; $C_{1-6}$ alkoxy; aryloxy such as phenoxy; $C_{1-6}$ alkylthio, $C_{6-36}$ aryl (e.g., phenyl, biphenyl, naphthyl, or the like); $C_{7-36}$ alkylaryl (e.g., tert-butyl phenyl, or 2,4-di-tert-butylphenyl); $C_{7-18}$ arylalkyl having 1 to 3 separate or fused rings (e.g., benzyl, 1-phenyl-1,1-dimethyl methylidene); or $C_{7-18}$ arylalkoxy having 1 to 3 separate or fused rings(e.g., benzyloxy). A combination of substituents can be used.

In one embodiment, $R^1$, $R^2$ and $R^3$ are each independently a $C_1$-$C_{22}$ alkyl, substituted $C_1$-$C_{22}$ alkyl, $C_3$-$C_8$ cycloalkyl, substituted $C_3$-$C_8$ cycloalkyl, aryl, or substituted aryl. In another embodiment, $R^1$, $R^2$ and $R^3$ are each independently aryl or substituted aryl, in particular an aryl substituted with a $C_{1-6}$ alkyl, a $C_{6-10}$ aryl, or a $C_{7-18}$ arylalkyl. Substitution with a $C_{4-6}$ alkyl, $C_6$ aryl, $C_{7-10}$ arylalkyl, or a combination comprising at least one of the foregoing groups, are also useful. In another embodiment, the phosphite has at least six substituted or unsubstituted aryl groups present in the molecule.

Specific exemplary heat stabilizers include (tris(2,4-di-t-butylphenyl)phosphite (CAS# 31570-04-4, trade name IRGAFOS 168, Ciba Geigy); bis(2,4-di-t-butylphenyl) pentaerythritol diphosphite (CAS# 26741-53-7, trade name ULTRANOX 626, GE Specialty Chemicals), distearyl pentaerythritol diphosphite (trade name WESTON 619, GE Specialty Chemicals), bis(2,4-dicumylphenyl) pentaerythritol diphosphite (CAS# 15486243-8, trade name DOVERPHOS 9228, Dover Chemical), tris [2-tert-butyl-4-thio-(2'-methyl-4'-hydroxy-5'-tert- butyl)-phenyl-5-methyl]-phenyl phosphite (trade name HOSTANOX OSP-1, Clariant), tetrakis(2,4-di-tert-butylphenyl)-4,4'-biphenylene diphosphonite, distearyl pentaerythritol diphosphite (trade name DOVERPHOS S-680, Dover Chemical), CAS# 26523-78-4 (trade name IRGAFOS TNPP, Ciba Specialty Chemicals), CAS#80693-00-1 (trade name MAARK PEP 36, Asahi Denka Co., Ltd.), CAS# 140221-14-3 (trade name MARK HP-10, Asahi Denka Co., Ltd.), CAS# 38613-77-3 (trade name IRGAFOS P-EPQ Ciba Specialty Chemicals), tris(2,4-di-tert-butylphenyl)phosphite (CAS# 119345-01-6, trade name SANDOSTAB P-EPQ Clariant Corp.), CAS# 118337-09-0 (trade name ETHANOX 398 Albemarle Corp.), CAS# 3806-34-6 (trade name WESTON 618, GE Specialty Chemicals), CAS# 80410-33-9 (trade name IRGAFOS 12, Ciba Specialty Chemicals), CAS# 145650-60-8 (trade name IRGAFOS 38, Ciba Specialty Chemicals), and CASH 161717-32-4 (trade name ULTRANOX 641, GE Specialty Chemicals.)

The phosphite stabilizer can be combined with the polycarbonate and light diffusing particles in an amount of about 0.04 wt % to about 0.09 wt %, or, more specifically, about 0.045 wt % to about 0.08 wt %, or, even more specifically, about 0.05 wt % to about 0.07 wt %, based upon a total weight of the ingredients in the composition (e.g., that are combined to form the film).

A variety of hindered phenol stabilizers may be used, for example, to improve the heat stability during molding, resistance to heat aging, and/or resistance to ultraviolet radiation of the polycarbonate. Examples of suitable hindered phenol stabilizers include α-tocopherol, butylhydroxytoluene, sinapyl alcohol, vitamin E, n-octadecyl-β-(4'-hydroxy-3',5 '-di-tert- butylphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis (4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6- tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl)propionate], bis[2-tert-butyl-4-methyl-6-(3-tert-butyl-5-methyl-2-hydroxybenzyl) phenyl] terephthalate, 3,9-bis{2-[3-(3-tert-butyl-4-hydroxy-5-methylphenyl) propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl] hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2-[3-(3,5-di-tert-butyl-4-hydroxyphenyl) propionyloxy]ethyl isocyanurate, tetrakis[methylene (3,5-di-tert-butyl-4-hydroxyhydrocinnamate)]methane, and tetrakis[methylene-3-(3',5'-di-tert-butyl-4-hydroxyphenyl)propionate]methane. The foregoing phenol-based stabilizers are generally commercially available, for example from Ciba Specialty chemicals under the trade name IRGANOX. Combinations comprising at least one of the foregoing hindered phenol stabilizers may be used.

The hindered phenol stabilizer can be combined with the polycarbonate and light diffusing particles in an amount of about 0.005 wt % to about 0.06 wt %, or, more specifically, about 0.01 wt % to about 0.04 wt %, or, even more specifically, about 0.015 wt % to about 0.03 wt %, based upon a total weight of the ingredients in the composition (e.g., that are combined to form the film).

Exemplary optical brighteners include, but are not limited to, derivatives of 4,4' bis(2-benzoxazolyl)stilbene, and 4,4'-diaminostilbene-2,2'-disulfonic acid, coumarin derivatives such as 4-methyl-7-diethylaminocoumarin, 1,4-bis(O-cyanostyryl) benzol, and 2-amino-4-methylphenol. Optical brighteners can be present in an amount of about 0.001 wt % to about 3.0 wt %, or, more specifically, about 0.001 wt % to about 1.0 wt %, based on a total weight of the light diffusing film.

While the thickness of the light diffusing film can vary depending on the desired application. For LCD TV applications, it has been discovered that the desired hiding power and luminance can be obtained when the light diffusing film has a thickness of about 0.5 millimeters (mm) about to about 5.0 mm, or, more specifically, about 1.0 to about 4.0 mm, or, even more specifically about 1.4 mm to about 3 mm, and even more specifically, a thickness of about 1.8 mm to about 2.2 mm.

In various embodiments, the light diffusing film can have a polished surface, a textured surface, or a combination comprising at least one of the foregoing. More particularly, the light diffusing film can comprise any surface texture that can provide the desired ease in handling and provides the desired cosmetic effect. For example, the light diffusing film can have a surface roughness (Ra) of about 0.01 micrometer to about 2 micrometers, or, more particularly, a surface roughness of about 0.25 micrometers to about 0.65 micrometers, wherein surface roughness values are measured in accordance with Japanese Industrial Standards (JIS B0601) as measured using a Kosaka ET4000 Surface profilometer. The Ra is a measure of the average roughness of the film. It can be determined by integrating the absolute value of the difference between the surface height and the average height and dividing by the measurement length for a one dimensional surface profile, or the measurement area for a two dimensional surface profile.

As briefly mentioned above, the light diffusing film can be a solid unitary film characterized by the absence of multiple layers. Advantageously, by making a film that is a unitary structure that does not comprise multiple layers, the overall cost of the light diffusing film can be reduced compared to a film that comprises multiple layers. Additionally, in various embodiments, the light diffusing film can be a solid sheet, which again can reduce the cost of manufacturing compared to a film including multiple layers. Further, a solid sheet light diffusing film can eliminate problems including delamination, lack of adhesion between coextruded layers, coating cracking, and the like that are associated with multiple layer structures (e.g., structures that comprise a substrate layer and an imprinted layer (e.g., co-extruded layer, coating layer, laminated layer, and so forth).

It has also been discovered that extruded films made using powder polycarbonate can aid in imparting the desired properties to the light diffusing film. For example, films made from virgin polycarbonate that has not been heat processed (even processed to make pellets which would heat the polycarbonate, giving it a heat history), have improved whiteness. Polycarbonate powder generally has a YI of about 0.8 to about 1.5, or, more specifically, about 0.9 to about 1.3, while polycarbonate pellets have a higher YI than the powder, generally the YI of the pellets is 1.7-2.7. For example, in making the light diffusing film, polycarbonate powder, the light diffusing particles, and any other additives that may be desired for one particular application, can be mixed and disposed in a hopper of an extruder. The polycarbonate, and optionally the additives, can be melted. The mixture is then extruded to form the sheet. For example, the mixture can be extruded through a slot die and passed through a nip between calendaring rolls to form the desired sheet. If powder with no heat history is used to form the sheet, the polycarbonate in the sheet has only one heat history.

Further, in various embodiments, the light diffusing film may comprise optical brightener(s), but does not comprise any dyes or colorants (i.e., is free of dyes and colorants) to reduce the yellowness index of the film. It has been discovered that dyes and/or colorants can adversely affect luminance (e.g., up to a 10% drop in luminance can be observed when using a color additive).

In one embodiment, the method of making a light diffusing film can comprise mixing a polycarbonate and light diffusing particles to form a mixture, melting the polycarbonate to form a melt, and extruding the melt in the form of a sheet to form the light diffusing film.

The specific processing conditions can vary depending upon the desired sheet composition and/or color. In some embodiments, enhanced whiteness (e.g., reduced change in x and/or y compared to PC 1311-50), can be obtained using an average barrel (extruder) temperature of about 200° C. to about 235° C., or, more specifically, about 204° C. to about 228° C., or, even more specifically, about 210° C. to about 220° C., wherein the average is the average of all of the extruder zones (e.g., see Table 13, the average barrel temperature would be the average of Extr Z1-Extr Z5, or 215° C.).

In some embodiments, in addition or alternative to the barrel temperature, the flow rate and/or screw speed may be controlled. The extruder speed can be about 65 rpm to about 85 rpm, or, more specifically, about 70 rpm to about 80 rpm. In some embodiments, a ratio of flow rate to extruder speed (i.e., flow rate (in kg/hr) divided by the extruder speed (in rpm)) can be about 3.5 to about 6.0, or, more specifically, about 3.7 to about 5.8, or, yet more specifically, about 3.9 to about 5.6.

EXAMPLES

The materials set forth in Table 1 were used in the Examples.

TABLE 1

| Commercial Name | Chemical Name | Commercially Available From: |
|---|---|---|
| Lexan* | polycarbonate | General Electric Plastics, Pittsfield, MA |
| PC1311-50 | polycarbonate light diffusing film | Teijin Chemical Ltd., Japan |
| Tospearl* 120 | poly(methyl silsesquioxane) | General Electric (GE) Silicones |
| Eastobrite OB-1 (optical brightner) | 4,4' bis(2-benzoxazolyl)stilbene | Eastman Chemical Company |
| Cyasorb* 3638 (UV stabilizer) | 2,2'-(1,4-Phenylene)bis[4H-3,1-benzoxazin-4-one] | Cytech |
| Cyasorb* 5411 (UV stabilizer) | 2-(2'hydroxy-5-t-octylphenyl)-benzotriazole | Cytech |
| ERL-4221 cycloaliphatic epoxy | 3,4-epoxy cyclohexyl methyl-3,4-epoxy cyclohexyl carboxylate | Dow Chemical Company |
| Irgafos* 168 (heat stabilizer) | tris(2,4-di-t-butylphenyl)phosphite | Ciba Geigy |
| Irganox* 1076 hindered phenol antioxidant | Octadecyl3(3,5di-tertbutyl) 4-hydroxyphenyl)propionate | Ciba Specialty Chemicals Corporation |
| Doverphos* S-9228 | Bis (2,4-dicumylphenyl) pentaerythritol diphosphite | Dover Chemical |
| Ganz pearl GM-105 | poly (methyl methacrylate) | Ganz Chemical |

TABLE 1-continued

| Commercial Name | Chemical Name | Commercially Available From: |
|---|---|---|
| Ganz pearl GM-205 | poly (methyl methacrylate) | Ganz Chemical |
| Weston DPDP | diphenyl isodecyl phosphite | GE specialty chemicals |

Examples 1-24

Examples 1-24 illustrate the use of diffusion particles in the diffusing film. In these following examples, light diffusing films were produced by the following process (Table 2) Masterbatch resin was pre-dried at 250° F. (degrees Fahrenheit) (about 121° C. (degrees Celsius)) overnight, on a line with a 92 mm twin screw extruder.

Figure 4:
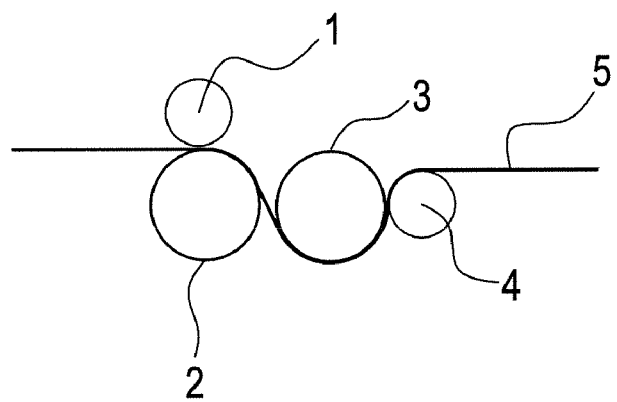
FIG. 4 is a schematic illustration of a roll configuration used in making an extruded film.

Cleaning was performed on the entire line before making the light diffusing film. The roll configuration illustrated in FIG. 4 was employed. In this example, four rolls were used with reference numerals 1 (for Roll 1), 2 (for Roll 2), 3 (for Roll 3), and 4 (Roll 4). Rolls 1 and 4 each had polish roll surface, while Rolls 2 and 3 had a matte roll surface. The extruded sheet was designated by reference number 5.

Polycarbonate resin was run through the line for about 3 to 5 hours to purge any black specs and the like from the extruder. At the end of purging, a detailed visual inspection was performed on the film.

TABLE 2

| Die Z (° C.) | Die Z2 (° C.) | Die Z3 (° C.) | Die Z4 (° C.) | Die Z5 (° C.) | Extruder speed (rpm) | Extr Z1 (° C.) | Extr Z2 (° C.) |
|---|---|---|---|---|---|---|---|
| 298 | 285 | 290 | 294 | 303 | 139 | 280 | 280 |

| Extr Z3 (° C.) | Extr Z4 (° C.) | ExtrZ5 (° C.) | Torque (%) | Lwf A | Lwf C | Output (kg/hr) | Line speed (m/min) |
|---|---|---|---|---|---|---|---|
| 280 | 200 | 200 | 80 | 90 | 10 | 450 | 2.23 |

| Ratio Roll 1 | Ratio Roll 3 | Scrp Z1 (° C.) | Scrp Z2 (° C.) | Temp R1 (° C.) | Temp R2 (° C.) | Temp R3 (° C.) | Temp R4 (° C.) |
|---|---|---|---|---|---|---|---|
| 1.01 | 1.02 | 221 | 221 | 80 | 147 | 158 | 154 |

Die Z1-Z5: temperatures of Zone 1-Zone 5
Extr Z1-Z5: Extrusion temperatures Zone 1-Zone 5
LWF(A): Weight fraction in hopper A (polycarbonate (PC) powder)
LWF (C): Weight fraction in hopper C (master batch)
Ratio Roll 1 and Ratio Roll 3: Ratio Roll 1 was the ratio of Roll 1 surface speed to Master Roll (i.e.,
Roll 2) surface speed, while Ratio Roll3 was the ratio of Roll 3 surface speed to Master Roll surface speed.
Scrp Z1: Screen pack temperatures Z1 to Z2
Temp R1 to R4: Temperatures of each roll (Rolls 1-4)

The masterbatch resin (See Table 4) was loaded into a hopper (hopper C for convenience in discussion) and PC powder into another hopper (hopper A for convenience in discussion). The flow rate of masterbatch resin was controlled to around 10% of the total flow rate. The transmission value of the diffuser sheet was measured against the specifications during the run. The transmission value of the sheet was adjusted in situ by varying the ratio of masterbatch loading to PC powder loading as necessary.

The resulting light diffusing films were cut into 2.05 meter×1.25 meter samples having a thickness of 2 millimeters. The refractive index (RI) of the Tospearl* was reported to be 1.42. The average particle size and concentration of the polymethyl silsesquioxane were varied.

In Table 3, the average particle size (in micrometers (μm)) and concentration (conc.) of the polymethyl silsesquioxane (based upon the weight of the polycarbonate) was varied and the luminance gain and hiding power for each light diffusing film composition was compared relative to a commercially available light diffusing film (PC1311-50). PC1311-50 was polycarbonate film comprising about 3.5 wt % acrylic particles, wherein weight percents were based on a total weight of the film. The PC1311-50 film had a thickness of about 2 millimeters and a transmission of 50.4%. The luminance gain (lum. gain) relative to PC1311-50 was measured using the 13 points test described above (measured using a Topcon BM-7 instrument), while the hiding power (HP) was calculated as described above. The backlight module film stack configuration used in these measurements comprised a polycarbonate light diffusing film at the bottom and 2 bottom diffusers (coated polyethylene terephthalate (PET) films with 0.127 mm thickness each, sold as D121 films by Tsujiden Co., Ltd) as the top layer. No prismatic films or dual prismatic films were employed in this measurement configuration. It was noted that the optimum performance for luminance and hiding power (as measured and discussed above) for this set of data was obtained by particles with an average size of 2 micrometers at 0.5 wt % in polycarbonate as shown in Example 6 in Table 3.

TABLE 3

| Ex. | Particle size (μm) | Conc. (wt %) | Lum. gain (%) | HP (%) |
|---|---|---|---|---|
| 1 | 1 | 0.35 | 93.90 | 0.13 |
| 2 | 1 | 0.50 | 92.80 | 0.03 |
| 3 | 1 | 0.65 | 91.00 | 0.11 |
| 4 | 1 | 0.80 | 89.90 | 0.07 |
| 5 | 2 | 0.35 | 98.90 | 1.18 |
| 6 | 2 | 0.50 | 97.00 | 0.73 |
| 7 | 2 | 0.65 | 92.20 | 0.20 |

TABLE 3-continued

| Ex. | Particle size (μm) | Conc. (wt %) | Lum. gain (%) | HP (%) |
|---|---|---|---|---|
| 8 | 2 | 0.80 | 96.00 | 0.32 |
| 9 | 3 | 0.70 | 98.00 | 0.46 |
| 10 | 3 | 1.00 | 96.20 | 0.09 |
| 11 | 3 | 1.30 | 95.70 | 0.09 |
| 12 | 4.5 | 1.60 | 94.50 | 0.40 |
| 13 | 4.5 | 1.90 | 93.60 | 0.35 |
| 14 | 4.5 | 2.20 | 93.70 | 0.14 |

For Examples 15-18, the formulation disclosed below in Table 4 was used in the light diffusing film, wherein the light diffusing particles were polymethyl silsesquioxane having an average particle size of 2 micrometers, obtained from General Electric (GE) Silicones under the trade name Tospearl* 120. The extrusion process explained above was used to manufacture a light diffusing film, which was cut to the above described sample sizes. In Examples 15-18, the yellowness index of the polycarbonate resin was varied.

TABLE 4

| Commercial Name | wt % MB[1] | wt % ST[2] |
|---|---|---|
| Lexan* 105 | 91.39 | 99.14 |
| Cyasorb* 5411 | 2.00 | 0.2 |
| Irgafos* 168 | 0.90 | 0.090 |
| Tospearl* 120 | 5.66 | 0.57 |
| Eastobrite-OB1 | 0.05 | 0.005 | wt % MB[1] is wt % based upon the weight of the master batch ("MB")
wt % ST[2] is wt % based upon the total weight of the sheet ("ST")

In Table 5, the yellowness index of the polycarbonate was varied. The average Color x and the average Color y was measured using a Topcon BM-7 instrument (CIE 1931). The delta x ("Δx" or "dx") and delta y ("Δy" or "dy") showed the change in each coordinate relative to PC1311-50. Also shown in Table 5 is the 13 points average luminance (13 pt. avg. lum.) measured in candela per squared meter ($cd/m^2$), the luminance gain (Lum. gain; relative to PC1311-50), and the hiding power (HP). The 13 point average luminance was greater than or equal to about 6,000 $cd/m^2$, and hiding power as reported when measured on a backlight module comprising 12 CCFLs, which were 500 millimeters (mm) in length, 3 mm diameter, and located 23 mm apart. Distance to the light diffusing film was 12 mm. Input voltage to the power inverter was 24 volts.

The set of experiments summarized in Table 5 illustrated that the resin powder quality, determined by yellowness index (YI), is a significant parameter for making high performance light diffusing films, wherein "high" performance was evaluated in terms of luminance gain and hiding power. It was noted that the YI less than 1.0 provides the best results for that set of data. (Example 17). More particularly, a yellowness index of 0.99 provided a luminance gain of 103.4% and a hiding power of 0.36 when compared to PC1311-50. Further, this data showed that at a yellowness index of 1.3, the film actually had a luminance less than PC13111-50. More particularly for Example 10 the luminance was 98.5% when compared to PC1311-50. A luminance gain of greater than or equal to 102% was obtained with YI of about 0.9 to 1.10.

In another set of tests, poly(methyl methacrylate) (PMMA) sold under the tradename Ganz pearl GM-105 having a particle size of 2.5 micrometers and the tradename Ganz pearl GM-205 having a particle size of 3.1 micrometers, each commercially available from Ganz Chemical Co., Ltd., were employed in making the light diffusing film by the above described process. The results were summarized below in Tables 6 and 7. The weight percents were based on the total weight of the light diffusing film.

TABLE 6

| Commercial Name | Ex. 19 | Ex. 20 | Ex. 21 | Ex. 22 | Ex. 23 | Ex. 24 |
|---|---|---|---|---|---|---|
| Lexan* 105 | 99.21 | 98.46 | 97.71 | 99.21 | 98.46 | 97.71 |
| Cyasorb 5411 | 0.20 | 0.20 | 0.20 | 0.20 | 0.20 | 0.20 |
| Irgafos 168 | 0.09 | 0.09 | 0.09 | 0.09 | 0.09 | 0.09 |
| Ganz pearl GM-105 | 0.50 | 1.25 | 2.00 | 0 | 0 | 0 |
| Ganz pearl GM-205 | 0 | 0 | 0 | 0.5 | 1.25 | 2.00 |

TABLE 7

| Ex. | Lum. gain (%) | HP (%) |
|---|---|---|
| 19 | 103.4 | 3.7 |
| 20 | 100.5 | 0.5 |
| 21 | 95.7 | 0.1 |
| 22 | 106.0 | 4.5 |
| 23 | 103.2 | 2.0 |
| 24 | 102.2 | 0.4 |

In this set of examples, Examples 19 and 23 exhibited a luminance greater than PC1311-50, but the hiding power was greater than 0.5. Without being bound by theory, it was

TABLE 5

| Ex. | Resin YI | Avg. Color x | Avg. Color y | Delta x | Delta y | 13 pt. avg. lum. ($cd/m^2$) | Lum. gain (%) | HP (%) |
|---|---|---|---|---|---|---|---|---|
| 15 | 1.27 | 0.3018 | 0.3189 | 0.0073 | 0.0103 | 6,454 | 100.8 | 0.31 |
| 16 | 1.30 | 0.3037 | 0.3210 | 0.0092 | 0.0124 | 6,279 | 98.5 | 0.30 |
| 17 | 0.99 | 0.2970 | 0.3131 | 0.0025 | 0.0045 | 6,602 | 103.4 | 0.36 |
| 18 | 1.09 | 0.2988 | 0.3148 | 0.0043 | 0.0062 | 6,533 | 102.0 | 0.16 |
| PC1311-50 | — | 0.2945 | 0.3086 | — | — | 6,405 | 100.0 | 0.44 | determined that, at a hiding power greater than 0.5, light and dark patterns may start to be observed. Example 24 had the best combination of luminance (102.2) and hiding power (0.4). As mentioned above, any luminance gain while increasing hiding power can provide a significant commercial advantage to the light diffusing film.

Examples 25-42

Examples 25-42 compare polyalkyl silsesquioxane (e.g., Tospearl) particles to poly(methyl methacrylate) and styrene copolymer (crosslinked PMMA-PS) particles in the diffusing film. These examples illustrate the high luminance unexpectedly attained with the crosslinked PMMA-PS particles.

Pellets with the formulation given in Tables 9 and 10 can be extruded into sheet form directly or alternatively a masterbatch approach can be utilized. Masterbatches with 20% by weight of PMMA-PS in polycarbonate were extruded on a 30 mm twin-screw extruder. Typical extrusion conditions were as follows: line rate (28 kg/hr), screw speed (450 rpm), torque (80%), and extruder heat profile (450° F. to 550° F. (e.g., 232° C. to 288° C.)).

Masterbatches comprising 20 wt % of crosslinked PMMA-PS particles were diluted with polycarbonate (PC) pellets at 5.2 times to obtain a sheet transmission at 59%. Final sheet formulation is shown in Tables 9 and 10. The optical characterization results of these sheets are given in Table 11. In this process, typically a master batch was used and mixed with natural color polycarbonate pellets in a 63.5 mm single screw extruder as described below in Table 8.

TABLE 8

| Die Z (° C.) | Die Z2 (° C.) | Die Z3 (° C.) | Die Z4 (° C.) | Die Z5 (° C.) | Extruder speed (rpm) | Extr Z1 (° C.) |
|---|---|---|---|---|---|---|
| 250 | 248 | 253 | 248 | 251 | 75 | 266 |

| Extr Z2 (° C.) | Extr Z3 (° C.) | Extr Z4 (° C.) | ExtrZ5 (° C.) | LWF A | LWF C | Output kg/hr |
|---|---|---|---|---|---|---|
| 249 | 254 | 257 | 260 | 90 | 10 | 113 |

| Ratio Roll 1 | Ratio Roll 3 | Scrp Z1 (° C.) | Scrp Z2 (° C.) | Temp R1 (° C.) | Temp R2 (° C.) | Temp R3 (° C.) |
|---|---|---|---|---|---|---|
| 1.02 | 1.15 | 221 | 221 | 85 | 121 | 149 |

Die Z1-Z5: temperatures of Zone 1-Zone 5
Extr Z1-Z5: Extrusion temperatures Zone 1-Zone 5
LWF(A): Weight fraction in hopper A (polycarbonate (PC) pellet)
LWF (C): Weight fraction in hopper C (master batch)
Ratio Roll 1 and Ratio Roll 3: Ratio Roll 1 was the ratio of Roll 1 surface speed to Master Roll (i.e., Roll 2) surface speed, while Ratio Roll 3 was the ratio of Roll 3 surface speed to Master Roll surface speed.
Scrp Z1: Screenpack temperatures Z1 to Z2
Temp R1 to R3: Temperatures of each roll (Rolls 1-3)

Cleaning was performed on the entire line before making the light diffusing film. The roll configuration was similar to that illustrated in FIG. 4. In these examples, only three rolls were used with reference numerals 1 (for Roll 1), 2 (for Roll 2), 3 (for Roll 3); Roll 4 was not used. The extruded sheet was designated by reference number 5. Since all of the rolls had polish surfaces, there was no texture on either side of the sheet.

Polycarbonate resin was run through the line for about 3 to 5 hours to purge any black specs and the like from the extruder. At the end of purging, a detailed visual inspection was observed on the film.

The masterbatch resin (See Table 9) was loaded into a hopper and PC powder into another hopper. The flow rate of masterbatch resin was controlled to around 10% of the total flow rate. The transmission value of the diffuser sheet was measured against the specifications during the run. The transmission value of the sheet was adjusted in situ by varying the ratio of masterbatch loading to PC powder loading as necessary.

The resulting light diffusing films were cut into 2.05 meter by 1.25 meters (m) samples having a thickness of 2 millimeters (mm). Compositions to make the films are set forth in Tables 9 and 10. Table 8 sets for the compositions for the films comprising the Tospearl* in Table 11, e.g., Examples 25-27, 31-33, and 37-39.

TABLE 9

| Commercial name | wt % MB | wt % ST |
|---|---|---|
| Lexan* 105 (RI 1.586) | 93.190 | 99.320 |
| Tospearl* 1120 (RI 1.42) | 5.660 | 0.566 |
| Cyasorb 5411 | 0.200 | 0.020 |
| Irgafos 168 | 0.900 | 0.090 |
| Eastobrite OB-1 | 0.050 | 0.005 |

Table 10 sets for the compositions for the films comprising the crosslinked PMMA-PS in Table 11, e.g., Examples 28-30, 34-36, and 40-42.

TABLE 10

| Commercial name | wt % MB | wt % ST |
|---|---|---|
| Lexan* | 79.400 | 96.030 |
| Poly (methyl methacrylate)-styrene copolymer (PMMA-PS) | 20.000 | 3.854 |
| Cyasorb* 5411 | 0.104 | 0.020 |
| Irgafos* 168 | 0.468 | 0.090 |
| Eastobrite OB-1 | 0.026 | 0.005 |

Examples 25-42 were measured with three different backlight (BLM) film stack configurations described from bottom to top (e.g., from the light side to the viewing side). In Configuration A, no prismatic films (PF) or reflective polarizer film (RPF) were employed; only a polycarbonate sheet and 2 bottom diffusers (known as D121 from Tsujiden Co. Ltd, made of coated polyethylene terephthalate, PET) were employed. In Configuration B, 1 polycarbonate diffuser sheet, 1 bottom diffuser D121, and 1 RPF, were used. In Configuration C 1 polycarbonate diffuser sheet with 1 D121, 1PF, and 1 RPF, in the BLM stack. PF and RPF films can be obtained from 3M Company.

Particle size was kept constant at 4 μm for crosslinked PMMA-PS copolymers, and 2 μm for Tospearl.

TABLE 11

| Ex. | Particle type | Transmission (%) | Lum Gain[1] (%) | HP (%) | color x | color y | color (dx) | color (dy) |
|---|---|---|---|---|---|---|---|---|
| | | Configuration A | | | | | | |
| 25 | Tospearl* | 59 | 100.00 | 0.22 | 0.3130 | 0.3385 | 0.0078 | 0.0096 |
| 26 | Tospearl* | 64 | 101.76 | 0.02 | 0.3126 | 0.3383 | 0.0075 | 0.0094 |
| 27 | Tospearl* | 74 | 100.46 | 0.53 | 0.3129 | 0.3382 | 0.0078 | 0.0093 |
| 28 | PMMA-PS | 59 | 103.85 | 0.15 | 0.3128 | 0.3393 | 0.0077 | 0.0104 |
| 29 | PMMA-PS | 64 | 104.31 | 0.10 | 0.3121 | 0.3381 | 0.0070 | 0.0092 |
| 30 | PMMA-PS | 74 | 105.01 | 0.28 | 0.3120 | 0.3380 | 0.0069 | 0.0091 |
| | | Configuration B | | | | | | |
| 31 | Tospearl* | 59 | 100.00 | 0.13 | 0.3184 | 0.3300 | 0.0103 | 0.0115 |
| 32 | Tospearl* | 64 | 102.15 | 0.07 | 0.3179 | 0.3296 | 0.0098 | 0.0111 |
| 33 | Tospearl* | 74 | 100.65 | 1.11 | 0.3182 | 0.3295 | 0.0101 | 0.0109 |
| 34 | PMMA-PS | 59 | 105.27 | 0.16 | 0.3179 | 0.3308 | 0.0097 | 0.0122 |
| 35 | PMMA-PS | 64 | 105.91 | 0.02 | 0.3172 | 0.3297 | 0.0090 | 0.0112 |
| 36 | PMMA-PS | 74 | 106.55 | 0.59 | 0.3169 | 0.3293 | 0.0087 | 0.0108 |
| | | Configuration C | | | | | | |
| 37 | Tospearl* | 59 | 100.00 | 0.20 | 0.3124 | 0.3225 | 0.0117 | 0.0134 |
| 38 | Tospearl* | 64 | 102.09 | 0.11 | 0.3122 | 0.3217 | 0.0115 | 0.0126 |
| 39 | Tospearl* | 74 | 99.13 | 0.08 | 0.3124 | 0.3215 | 0.0116 | 0.0123 |
| 40 | PMMA-PS | 59 | 106.54 | 0.15 | 0.3122 | 0.3231 | 0.0115 | 0.0140 |
| 41 | PMMA-PS | 64 | 106.84 | 0.12 | 0.3115 | 0.3221 | 0.0107 | 0.0129 |
| 42 | PMMA-PS | 74 | 106.92 | 0.04 | 0.3114 | 0.3215 | 0.0107 | 0.0123 |

The measurements set forth in Table 11 were made in accordance with the measurement techniques for the results of Table 5 except that the 13 point average luminance was greater than or equal to about 5,000 cd/m². The baseline in this Table is the Tospearl* for the luminance gain: Samples 38-42 other samples are normalized to Example 37 for the luminance gain. As is evident from the data set forth in Table 11, an additional increase in luminance of up to about 6% can be attained with a particle having an RI of about 1.5 to about 1.55, or, more specifically, 1.51 to 1.53, and a particle size of less than or equal to 5 μm, or, more specifically, 3 μm to 5 μm. These improvements have been attained at a transmission of about 55% to about 75% (e.g., see Example 42 versus Example 39), and at a hiding power of less than 0.5.

Examples 43-50

Examples 43-50 address the color of the sheets (light diffusing films). Customers generally demand "white" sheets. Therefore, the color of the sheets has been investigated and yellowness has been reduced. In the examples, an average color x and average color y was measured with a Topcon BM-7 instrument in accordance with CIE 1931, and the deltax(Δx), as well as the delta y (Δy) were determined relative to Teijin sheet PC1311-50.

A sheet, Example 43, having the formulation set forth in Table 4 above, was compared to a sheet, Example 44, having the formulation set forth in Table 12 below.

TABLE 12

| Commercial Name | wt % MB | wt % ST |
|---|---|---|
| Lexan* 105 | 92.45 | 99.24 |
| Tospearl* 120 | 5.7 | 0.57 |
| Eastobrite OB-1 | 0.05 | 0.005 |
| Cyasorb* 3638 | 0.8 | 0.08 |
| ERL-4221 | 0.2 | 0.02 |
| Irganox* 1076 | 0.2 | 0.02 |
| Doverphos* S-9228 | 0.6 | 0.06 |

The process conditions used to make the sheets of Examples 43-46 are set forth in Table 13. Here, the average extruder temperature was 215° C., and the flow rate (kg/hr) to screw speed (rpm) ratio was 310:74, i.e., about 4.2.

TABLE 13

| Die Z (° C.) | Die Z2 (° C.) | Die Z3 (° C.) | Die Z4 (° C.) | Die Z5 (° C.) | Extruder speed (rpm) | Extr Z1 (° C.) | Extr Z2 (° C.) |
|---|---|---|---|---|---|---|---|
| 296 | 288 | 292 | 293 | 291 | 74 | 202 | 208 |

| Extr Z3 (° C.) | Extr Z4 (° C.) | Extr Z5 (° C.) | Torque (%) | Lwf A | Lwf C | Output (kg/hr) | Line speed (m/min) |
|---|---|---|---|---|---|---|---|
| 233 | 210 | 234 | 76 | 90 | 10 | 310 | 1.43 |

| Ratio Roll 1 | Ratio Roll 3 | Scrp Z1 (°) | Scrp Z2 (° C.) | Temp R1 (° C.) | Temp R2 (° C.) | Temp R3 (° C.) | Temp R4 (° C.) |
|---|---|---|---|---|---|---|---|
| 1.45 | 1.53 | 402 | 402 | 80 | 147 | 158 | 154 |

Color measurements taken of 80 mil (2 mm) color chips made from the formulations of Examples 43 and 44 were taken using a Macbeth 7000A (D65 light source, 10 degree observer, CIE (1931), SCI, and UVEXC). The results are set forth in Table 14.

TABLE 14

| Ex. | Y | x | y | L | a | b |
|---|---|---|---|---|---|---|
| 43 | 58.43 | 0.3165 | 0.3331 | 80.98 | 0.2764 | 1.1060 |
| 44 | 58.54 | 0.3154 | 0.3318 | 81.04 | 0.3730 | 0.5058 |

The results in Table 14 show improved color. For example, the "b" value of Example 44 decreased 54% compared to Example 43, which is a good indication of decrease in yellowness of the chips.

Luminance, color, and hiding power results of Examples 45-50 diffuser sheets were determined using different BLM configurations, with the different configurations described above in relation to Examples 25-42. Examples 45, 47, and 49, were formed using the formulation of Table 4, while Examples 46, 48, and 50, were formed using the formulation of Table 12, all using the line configuration of FIG. 4. Polycarbonate powder was run through the line for about 3 to 5 hours to purge any black specs and the like from the extruder. The masterbatch resin and PC were loaded into separate hoppers. The flow rate of masterbatch resin was controlled to around 10% of the total flow rate. The transmission value of the diffuser sheet was measured during the run. The transmission value of the sheet was adjusted in situ by varying the ratio of masterbatch loading to PC powder loading as necessary. The color, hiding power, transmission, and luminance gain (determined in the manner described in relation to Table 5), are set forth in Table 15.

TABLE 15

| Ex | Transmission (%) | Lum. Gain (%) | HP (%) | x | dx | y | dy |
|---|---|---|---|---|---|---|---|
| Configuration A ||||||||
| 45 | 58 | 102.10 | 0.05 | 0.3109 | 0.0039 | 0.3363 | 0.0054 |
| 46 | 58 | 102.67 | 0.19 | 0.3090 | 0.0020 | 0.3338 | 0.0028 |
| Configuration B ||||||||
| 47 | 58 | 102.46 | 0.03 | 0.3151 | 0.0053 | 0.3276 | 0.0068 |
| 48 | 58 | 103.25 | 0.26 | 0.3126 | 0.0028 | 0.3244 | 0.0036 |
| Configuration C ||||||||
| 49 | 58 | 101.16 | 0.02 | 0.3091 | 0.0067 | 0.3178 | 0.0078 |
| 50 | 58 | 103.07 | 0.27 | 0.3064 | 0.0040 | 0.3154 | 0.0053 |

As can be seen from the data in Table 15, the transmission for all of the sheets was constant. The luminance gain was improved for all configurations, and especially Configuration C. The hiding power was maintained below 0.5%, while the color of the diffuser sheets improved dramatically. For Configuration C, dx was reduced about 40%, while dy was reduced about 30%. Additionally, for Configurations A and B, dx and dy were reduced nearly 50%, (e.g., from 0.0039 to 0.0020 for dx and from 0.0054 to 0.0028 for dy, in Configuration A).

Examples 51-70

Tables 16-18 provide various formulations, while Table 19 compares the whiteness (dx, dy: difference of x,y, from formulation reported in Table 4; i.e., the formulation of Table 4 was used as the baseline).

TABLE 16

| | Examples (wt % ST) | | | | | |
|---|---|---|---|---|---|---|
| Name | 51 | 52 | 53 | 54 | 55 | 56 |
| Lexan* 105 | 99.23 | 99.20 | 99.23 | 99.20 | 99.20 | 99.17 |
| Cyasorb* 5411 | 0.20 | 0.20 | 0.20 | 0.20 | 0.20 | 0.20 |
| Irgafos* 168 | 0.06 | | | 0.06 | 0.06 | 0.06 |
| Doverphos* S-9228 | | 0.09 | 0.06 | | | |
| Weston DPDP | | | | | 0.03 | 0.03 |
| ERL-4221 | | | | 0.03 | | 0.03 |
| Eastobrite OB-1 | 0.005 | 0.005 | 0.005 | 0.005 | 0.005 | 0.005 |
| Tospearl* 120A | 0.57 | 0.57 | 0.57 | 0.57 | 0.57 | 0.57 |

TABLE 17

| | (wt % ST) | | | | | |
|---|---|---|---|---|---|---|
| | Examples | | | | | |
| Name | 57 | 58 | 59 | 60 | 61 | 62 |
| Lexan* 105 | 99.17 | 99.20 | 99.17 | 99.14 | 99.11 | 99.17 |
| Cyasorb* 5411 | 0.20 | 0.20 | 0.20 | 0.20 | 0.20 | 0.20 |
| Doverphos* S-9228 | 0.06 | 0.03 | 0.03 | 0.03 | 0.03 | |

TABLE 17-continued

| | (wt % ST) | | | | | |
|---|---|---|---|---|---|---|
| | Examples | | | | | |
| Name | 57 | 58 | 59 | 60 | 61 | 62 |
| Weston DPDP | | | 0.03 | 0.03 | 0.03 | 0.03 |
| ERL-4221 | | | | 0.03 | 0.06 | 0.03 |

TABLE 17-continued (wt % ST)

| | Examples | | | | | |
|---|---|---|---|---|---|---|
| Name | 57 | 58 | 59 | 60 | 61 | 62 |
| Eastobrite* OB-1 | 0.005 | 0.005 | 0.005 | 0.005 | 0.005 | 0.005 |
| Tospearl* 120A | 0.57 | 0.57 | 0.57 | 0.57 | 0.57 | 0.57 |

TABLE 18

(wt % ST)

| | Examples | | | | | | | |
|---|---|---|---|---|---|---|---|---|
| Name | 63 | 64 | 65 | 66 | 67 | 68 | 69 | 70 |
| Lexan* 105 | 99.27 | 99.24 | 99.21 | 99.18 | 99.22 | 99.16 | 99.22 | 99.16 |
| Cyasorb* 3638 | 0.10 | 0.10 | 0.10 | 0.10 | 0.10 | 0.10 | 0.10 | 0.10 |
| Irgafos* 168 | | | | | 0.06 | 0.06 | | |
| Irganox* 1076 | | | | | 0.05 | 0.05 | 0.05 | 0.05 |
| Doverphos* S-9228 | 0.06 | 0.06 | 0.06 | 0.06 | | | 0.06 | 0.06 |
| ERL-4221 | | 0.03 | 0.06 | 0.09 | | 0.06 | | 0.06 |
| Eastobrite* OB-1 | 0.005 | 0.005 | 0.005 | 0.005 | 0.005 | 0.005 | 0.005 | 0.005 |
| Tospearl* 120A | 0.57 | 0.57 | 0.57 | 0.57 | 0.57 | 0.57 | 0.57 | 0.57 |

The formulations above were used to produce color chips that were tested for color in using a Macbeth 7000A (D65 light source, 10 degree observer, CIE (1931), SCI, and UVEXC). Table 4 and Table 12 refer to the formulations employed to attain the reported results. The chip of the composition of Table 4 was used as the baseline. The color chips were formed by dry blending all the ingredients were dry blended for 6 minutes using a stainless steel shaker. The formulations were compounded on a 30 mm vacuum vented, twin screw WP extruder at 177° C.-260° C.-271° C.-276° C.-282° C. barrel temperatures. The screw speed was 500 rpm. The feed rate was adjusted to maintain about 80% to about 85% torques. Prior to molding extruded batches into color chips for evaluation, the material was dried in an air drying oven at about 121° C. for about 4 hours. Dried batches were molded on a Van Dom 260 ton press into 50 mm×75 mm color chips with a thickness at the center of about 80 mil (2 mm). Typical molding parameters were: mold temperature of 93° C.; barrel temperatures of 316° C., 304° C., 304° C., and 299° C. an the nozzle; inject pressure of about 800 psi; hold pressure of about 400 psi for 8 seconds; back pressure of about 50 psi; cycle time of 45 minutes; inject travel time of 0.64 cm/sec; and a screw speed of 90 rpm.

After cooling, chips were measured on a Netprofiled* Macbeth 7000A color spectrophotometer. Spectrophotometer parameters were: transmission mode, light source D65, 100 observer, UV spectral energy excluded. All color data are reported using CIE 1931 (XYZ) color space equations.

TABLE 19

| | Color | |
|---|---|---|
| Example | dx | dy |
| Table 4 | 0.0000 | 0.0000 |
| Table 12 | −0.0023 | −0.0024 |
| 51 | 0.0000 | 0.0001 |
| 52 | −0.0012 | −0.0016 |
| 53 | −0.0012 | −0.0015 |
| 54 | −0.0005 | −0.0006 |
| 55 | −0.0006 | −0.0007 |
| 56 | −0.0008 | −0.0009 |
| 57 | −0.0007 | −0.0008 |
| 58 | −0.0005 | −0.0006 |
| 59 | −0.0002 | −0.0001 |
| 60 | −0.0005 | −0.0004 |
| 61 | −0.0006 | −0.0005 |
| 62 | −0.0002 | −0.0001 |
| 63 | −0.0015 | −0.0017 |
| 64 | −0.0021 | −0.0022 |
| 65 | −0.0018 | −0.0018 |
| 66 | −0.0013 | −0.0014 |
| 67 | −0.0013 | −0.0015 |
| 68 | −0.0015 | −0.0016 |
| 79 | −0.0019 | −0.0021 |
| 70 | −0.0018 | −0.0019 |

With regard to the above data, the baseline of zero is based upon the formulation of Table 4. The more negative the results, the "whiter" the sample. As customers desire white samples, enhancing the whiteness is strongly desired. As is supported by the above data, whiter sheets can be formed by combining polycarbonate (e.g., about 99.75 wt % to about 99.88 wt %), with about 0.05 wt % to about 0.1 wt % light diffusing particles, about 0.015 wt % to about 0.03 wt % epoxy stabilizer, about 0.01 wt % to about 0.03 wt % hindered phenol stabilizer, and about 0.04 wt % to about 0.09 wt % phosphite stabilizer, to produce a whiter film (e.g., whiter than the film produced from the composition of Table 4).

For example, light diffusing film can comprising: about 90 weight percent to about 99.9 wt % polycarbonate, about 0.04 wt % to about 0.09 wt % phosphite stabilizer, about 0.015 wt % to about 0.03 wt % epoxy stabilizer, about 0.01 wt % to about 0.03 wt % hindered phenol stabilizer, and about 0.001 wt % to about 10 wt % light diffusing particles having a refractive index of about 1.3 to about 1.7, or the reaction product thereof, wherein the weight percentages are based upon a total weight of ingredients combined prior to any reaction. The film comprises a hiding power of 0 to about 0.5.

Advantageously, the light diffusing films made with crosslinlked PMMA-PS particles can have a much higher performance compared to current commercially available light diffusing films. More particularly, the light diffusing film can provide a 5% or greater increase in luminance (brightness) compared to films containing Tospearl* (which has an RI of 1.42), while having a hiding power of 0 to about 0.5, which is a significant improvement in the art. Further, it is noted that the light diffusing film disclosed herein can be a solid unitary film characterized by the absence of multiple layers, which can advantageously reduce the overall cost and improved reliability of the light diffusing film compared to multi-layer films that are formed by lamination, coating or co-extrusion.

The ability to hide a light and dark light pattern(s) created by an array of CCFL's (hiding power) is important in applications such as LCD TVs and the like). This can be accomplished with light diffusion, so that one cannot see the image of the CCFL's through the diffuser sheet. Hence, it is desirable that as much light as possible pass through the diffuser sheet (i.e. diffuser sheet should have high luminance (brightness)). Balance of these properties, hiding power and luminance, provides superior performance. A diffuser film comprising light diffusing particles having a refractive index (RI) of about 1.50 to about 1.55 (e.g., crosslinked PMMA-PS particles) and a particle diameter of about 2 μm to about 5 μm, enables such a balance, providing unexpectedly enhanced luminance while retaining hiding power.

The terms "first," "second," and the like herein do not denote any order or importance, but rather are used to distinguish one element from another, and the terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). "Combination" is inclusive of blends, mixtures, alloys, reaction products, and the like. Furthermore, all ranges disclosed herein are inclusive and combinable (e.g., ranges of "up to about 25 weight percent (wt %), with about 5 wt % to about 20 wt % desired, and about 10 wt % to about 15 wt % more desired," is inclusive of the endpoints and all intermediate values of the ranges, e.g., "about 5 wt % to about 25 wt %, about 5 wt % to about 15 wt %," etc.). The suffix "(s)" as used herein is intended to include both the singular and the plural of the term that it modifies, thereby including at least one of that term (e.g., the colorant(s) includes at least one colorants). Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. As used herein, particle size is an average size as measured along the major axis (i.e., the longest axis) of the particle.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A light diffusing film,
    wherein the film is formed from a composition comprising:
        a polycarbonate, wherein the polycarbonate has a yellowness index of about 0.8 to about 1.5 as measured in accordance with ASTM E313-73 (D1925);
        phosphite stabilizer;
        epoxy stabilizer;
        hindered phenol stabilizer; and
        light diffusing particles having a refractive index of about 1.3 to about 1.7;
        wherein weight percents are based upon a total weight of the composition; and
    wherein the film comprises a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_i(\text{off})$ is luminance at a midpoint between cold cathode fluorescent lamp j and cold cathode fluorescent lamp j+1, and n equals number of CCFL lamps; and
    wherein the light diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

2. The light diffusing film of claim 1, wherein the composition comprises about 0.005 wt % to about 0.06 wt % epoxy stabilizer.

3. The light diffusing film of claim 1, wherein the composition comprises about 0.015 wt % to about 0.04 wt % epoxy stabilizer, about 0.04 wt % to about 0.09 wt % phosphite stabilizer, and about 0.001 wt % to about 7 wt % light diffusing particles.

4. The light diffusing film of claim 1, wherein the composition comprises about 0.015 wt % to about 0.03 wt % epoxy stabilizer, about 0.01 wt % to about 0.03 wt % hindered phenol stabilizer, and about 0.04 wt % to about 0.09 wt % phosphite stabilizer.

5. The light diffusing film of claim 1, wherein the composition comprises about 0.04 wt % to about 0.09 wt % phosphite stabilizer.

6. The light diffusing film of claim 1, wherein the composition comprises about 0.005 wt % to about 0.06 wt % hindered phenol stabilizer.

7. The light diffusing film of claim 1, wherein the composition comprises about 0.01 wt % to about 0.04 wt % hindered phenol stabilizer.

8. The light diffusing film of claim 1, wherein the light diffusing particles comprise a material selected from the group consisting of silsesquioxanes, fluorinated polymers, homopolymers formed from styrene, copolymers formed from styrene, acrylic acid, metal sulfates, metal oxides, metal hydroxides, metal carbonates, metal silicates, and combinations comprising at least one of the foregoing.

9. The light diffusing film of claim 8, wherein the material comprises polyorgano silsesquioxane.

10. The light diffusing film of claim 1, wherein the light diffusing particles comprise a material are selected from the group consisting of poly(styrene), poly(acrylic acid), poly(methyl methacrylate), poly(acrylic acid-styrene) copolymers, poly($C_{1-8}$ alkylacrylate-$C_{1-8}$ alkylmethacrylate) copolymers, and combinations comprising at least one of the foregoing.

11. The light diffusing film of claim 10, wherein the material comprises poly(methyl methacrylate)-polystyrene copolymer.

12. The light diffusing film of claim 1, wherein the virgin polycarbonate was produced by an interfacial reaction.

13. A light diffusing film formed in accordance with the method comprising:
combining about 90 wt % to about 99.9 wt % polycarbonate, about 0.04 wt % to about 0.09 wt % phosphite stabilizer, about 0.015 wt % to about 0.03 wt % epoxy stabilizer, about 0.01 wt % to about 0.03 wt % hindered phenol stabilizer and light diffusing particles to form a combination, wherein the light diffusing particles have a refractive index of about 1.3 to about 1.7; and
forming the combination into the light diffusing film;
wherein the light diffusing film comprises a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps;
wherein the polycarbonate is virgin polycarbonate powder which has not been heat processed, and which has a yellowness index of about 0.8 to about 1.5 as measured in accordance with ASTM E313-73 (D1925).

14. The light diffusing film of claim 13, wherein the light diffusing film has a 13 points average luminance that is greater than a polycarbonate film 13 points average luminance, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

15. A display device, comprising:
a liquid crystal display;
a light source disposed in optical communication with the liquid crystal display; and
a light diffusing film disposed between the liquid crystal display and the light source, wherein the light diffusing film comprises a polycarbonate, a phosphite stabilizer, an epoxy stabilizer, and light diffusing particles having a refractive index of about 1.3 to about 1.7; and
wherein the light diffusing film comprises a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and
wherein the light diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

16. A light diffusing film, comprising the reaction product of:
about 90 wt % to about 99.9 wt % virgin polycarbonate powder which has not been heat processed, and which has a yellowness index of about 0.8 to about 1.5 as measured in accordance with ASTM E313-73 (D1925);
about 0.04 wt % to about 0.09 wt % phosphite stabilizer;
about 0.015 wt % to about 0.03 wt % epoxy stabilizer;
about 0.01 wt % to about 0.03 wt % hindered phenol stabilizer; and
about 0.001 wt % to about 10 wt % light diffusing particles having a refractive index of about 1.3 to about 1.7;
wherein the weight percentages are based upon a total weight of ingredients combined prior to any reaction; and
wherein the film comprises a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_j(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps.

17. A light diffusing film,
wherein the film is formed from a composition comprising:
virgin polycarbonate powder which has not been heat processed, wherein the virgin polycarbonate has a yellowness index of about 0.8 to about 1.5 as measured in accordance with ASTM E313-73 (D1925);
phosphite stabilizer;
epoxy stabilizer;
hindered phenol stabilizer;
optical brightener; and
light diffusing particles having a refractive index of about 1.3 to about 1.7; and
wherein the film comprises a hiding power of 0 to about 0.5 that is mathematically described by the following equation:

$$\text{Hiding power}(\%) = \left|1 - \frac{\sum_{i=1}^{n-1} L_i(\text{on})}{\sum_{j=1}^{n-1} L_j(\text{off})}\right| \times 100$$

wherein: $L_j(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps;
wherein the light diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

18. The light diffusing film of claim 17, wherein the light diffusing particles comprise polymethyl silsesquioxane.

19. The light diffusing film of claim 17, wherein the composition comprises about 0.001 wt % to about 3.0 wt % optical brighteners, based on a total weight of the light diffusing film.

20. The light diffusing film of claim 17, wherein the optical brightener is selected from the group consisting of derivatives of 4,4'bis(2-benzoxazolyl)stilbene, 4,4'- diaminostilbene-2,2'-disulfonic acid, and coumarin derivatives.

21. A light diffusing film,
wherein the light diffusing film is formed from a composition comprising:
a polycarbonate, wherein the polycarbonate comprises no dyes or colorants and has a yellowness index of about 0.8 to about 1.5 as measured in accordance with ASTM E313-73 (D1925);
phosphite stabilizer;
epoxy stabilizer;
hindered phenol stabilizer; and
light diffusing particles having a refractive index of about 1.3 to about 1.7; and wherein the light diffusing film comprises a hiding power of 0 to about 0.5 that is mathematically described by the following equation:

$$\text{Hiding power}(\%) = \left|1 - \frac{\sum_{i=1}^{n-1} L_i(\text{on})}{\sum_{j=1}^{n-1} L_j(\text{off})}\right| \times 100$$

wherein : $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and
wherein the light diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

22. A light diffusing film,
wherein the film is formed from a composition comprising:
about 90 wt % to about 99.9 wt % polycarbonate;
about 0.04 wt % to about 0.09 wt % phosphite stabilizer;
about 0.015 wt % to about 0.03 wt % epoxy stabilizer;
about 0.01 wt % to about 0.03 wt % hindered phenol stabilizer; and
about 0.001 wt % to about 10 wt % light diffusing particles, wherein the light diffusing particles comprise polyorgano silsesquioxane;
wherein weight percents are based upon a total weight of the composition; and
wherein the film comprises a hiding power of 0 to about 0.5 that is mathematically described by the following equation:

$$\text{Hiding power}(\%) = \left|1 - \frac{\sum_{i=1}^{n-1} L_i(\text{on})}{\sum_{j=1}^{n-1} L_j(\text{off})}\right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and
wherein:
(i) The light diffusing film has a 13 points average luminance that is greater than a 13 points average luminance of a polycarbonate film, as determined by a 13 points test using a Topcon BM-7 instrument, wherein said polycarbonate film comprises about 3.5 wt % acrylate particles based on a total weight of the polycarbonate film, and the polycarbonate film has a thickness of 2 millimeters and a transmission of 50.4%, as determined in accordance with ASTM D1003-00 and as measured with instrument Macbeth 7000A, D65 light source illuminant, 10° observer; or p1 (ii) The polycarbonate is virgin polycarbonate powder which has not been heat processed, and which has a yellowness index of about 0.8 to about 1.5 as measured in accordance with ASTM E 313-73 (D1925); or (iii) The polycarbonate comprises no dyes or colorants and has a yellowness index of about 0.8 to about 1.5 as measured in accordance with ASTM E313-73 (D1925).

* * * * *